United States Patent
Hwang et al.

(10) Patent No.: US 7,251,273 B2
(45) Date of Patent: Jul. 31, 2007

(54) MINIMUM EQUALIZATION ERROR BASED CHANNEL ESTIMATOR

(75) Inventors: Chien-Meen Hwang, San Jose, CA (US); Ping Hou, San Carlos, CA (US); Jia-Pei Shen, Stanford, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 976 days.

(21) Appl. No.: 10/367,865

(22) Filed: Feb. 19, 2003

(65) Prior Publication Data

US 2004/0161066 A1 Aug. 19, 2004

(51) Int. Cl.
*H03H 7/30* (2006.01)

(52) U.S. Cl. ..................... 375/229; 375/346
(58) Field of Classification Search ............. 375/346, 375/229
See application file for complete search history.

(56) References Cited

OTHER PUBLICATIONS

Rouzet, "D4: Exploration of the HIPERLAN/2 standard and comparison with other wireless LAN standards", EASY,Jan. 31, 2002.*
IEEE Std. 802.11a-1999, "Part 11: Wireless LAN Medium Access Control (MAC) and Physical Layer (PHY) specifications: High-speed Physical Layer in the 5 GHZ Band", L.AN/MAN Standards Committee of the IEEE Computer Society, IEEE-SA Standards Board, Approved Sep. 16, 1999, New York, USA.

Larsson et al., "An Algorithm For Joint Symbol Timing and Channel Estimation for OFDM Systems", IEEE, Aug. 6, 2001, pp. 393-396.
Hsu et al., "Design of an OFDM Receiver for High-speed Wireless LCN", ISCAS 2001, Proceedings of the 1002 IEEE International Symposium on Circuits and Systems, New York, NY, IEEE vol. 1 of 5, May 6, 2001, pp. IV-558-IV-561.
Armour et al., "A Pre-FFT Equalizer Design for Application to Hiperlan/2", IEEE, vol. 4, Sep. 24, 2000, pp. 1690-1697.
Onozawa et al., "A Simple Adaptive Channel Estimation Scheme for OFDM Systems", Vehicular Technology Conference, 1999, VTC 1999-Fall, IEEE VTS 50th Amsterdam, Netherlands, Sep. 19-22, 1999, Piscataway, NJ, USA, IEEE, US, Sep. 19, 1999, pp. 279-283.

* cited by examiner

*Primary Examiner*—Temesghen Ghebretinsae
*Assistant Examiner*—Juan Alberto Torres
(74) *Attorney, Agent, or Firm*—Manelli Denison & Selter PLLC; Leon R. Turkevich

(57) ABSTRACT

A channel estimator, configured for supplying equalization coefficients to a frequency equalizer, is configured for determining equalizer coefficients for a received wireless signal based on a minimum equalization error-based estimation. The channel estimator is configured for identifying first and second long preambles from the received wireless signal, determining an equalization coefficient for a selected frequency based on a minimized cost function for the first and second long preambles relative to a prescribed preamble value for the selected frequency, and supplying the equalization coefficient for the selected frequency to a frequency equalizer for equalization of the received wireless signal.

6 Claims, 4 Drawing Sheets

MINIMUM EQUALIZATION ERROR BASED CHANNEL ESTIMATOR

BACKGROUND OF THE INVENTION

1. Field of the Invention

The present invention relates to implementation of a Channel Estimator in a wireless receiver, for example a IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, et. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device that can be implemented in smaller wireless devices. Hence, implementation concerns typically involve cost, device size, and device complexity.

For example, conventional design approaches for a design equalizer would be to determine an estimate of channel effects on a transmitted signal, and implement equalizer coefficients based on the inverse function of the estimate of the channel effects. In particular, FIG. 1 is a diagram illustrating a frequency based receiver model 10, where a transmitter 12 outputs a frequency modulated signal X(f). The frequency modulated signal X(f) encounters frequency-selective channel distortion H(f) 14 (i.e., fading), and white Gaussian noise N(f) 16. Hence, the wireless signal Y(f) received by the receiver can be characterized by the transfer function:

$$Y(f)=X(f)H(f)+N(f).$$

A conventional approach to designing a frequency equalizer 18 would involve obtaining an estimate for the channel distortion H(f), and generating an inverse of the channel distortion, such that an estimate X'(f) of the frequency modulated signal X(f) can be obtained by Y(f)/H(f), or equivalently Y(f)*[1/H(f)]. However, the noise N(f) is included in the received wireless signal Y(f), hence using the inverse of the channel distortion this approach may amplify the channel noise N(f) in the equalized signal:

$$X'(f)=[Y(f)-N(f)]*[1/H(f)].$$

Hence, attempts to equalize the received signal Y(f) may greatly amplify the noise component N(f), to where the amplified noise may even exceed the originally transmitted signal X(f) if the channel distortion value H(f) is small.

SUMMARY OF THE INVENTION

There is a need for an arrangement that enables a wireless transceiver to perform equalization of a received frequency-modulated signal in an efficient and economical manner.

There also is a need for an arrangement that enables a wireless transceiver to perform equalization of a received frequency-modulated signal with minimum equalization error.

There also is a need for an arrangement that enables a wireless transceiver to perform equalization of a received frequency-modulated signal, having received preambles corresponding to a prescribed preamble, having linear properties enabling use with minimal equalization errors over a substantial dynamic range.

These and other needs are attained by the present invention, where a channel estimator, configured for supplying equalization coefficients to a frequency equalizer, is configured for determining equalizer coefficients for a received wireless signal based on a minimum equalization error-based estimation. The channel estimator is configured for identifying first and second long preambles from the received wireless signal, determining an equalization coefficient for a selected frequency based on a minimized cost function for the first and second long preambles relative to a prescribed preamble value for the selected frequency, and supplying the equalization coefficient for the selected frequency to a frequency equalizer for equalization of the received wireless signal.

One aspect of the present invention provides a method in an OFDM receiver for generating an equalizer coefficient for equalization of a received wireless signal by a frequency equalizer. The method includes identifying first and second long preambles from the received wireless signal, and determining in a channel estimator an equalization coefficient for a selected frequency based on a minimized cost function for the first and second long preambles relative to a prescribed preamble value for the selected frequency. The method also includes supplying the equalization coefficient for the selected frequency to the frequency equalizer.

Another aspect of the present invention provides an OFDM receiver comprising a frequency equalizer and a channel estimator. The frequency equalizer is configured for equalizing a received wireless signal for a selected frequency based on a corresponding equalization coefficient. The channel estimator is configured for determining the equalization coefficient for the selected frequency based on a minimized cost function for identified first and second long preambles, within the received wireless signal, relative to a prescribed preamble value for the selected frequency Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11a OFDM transceiver, followed by a detailed description of the channel estimator implemented according to an embodiment of the present invention.

Receiver Architecture Overview

Figure 2:
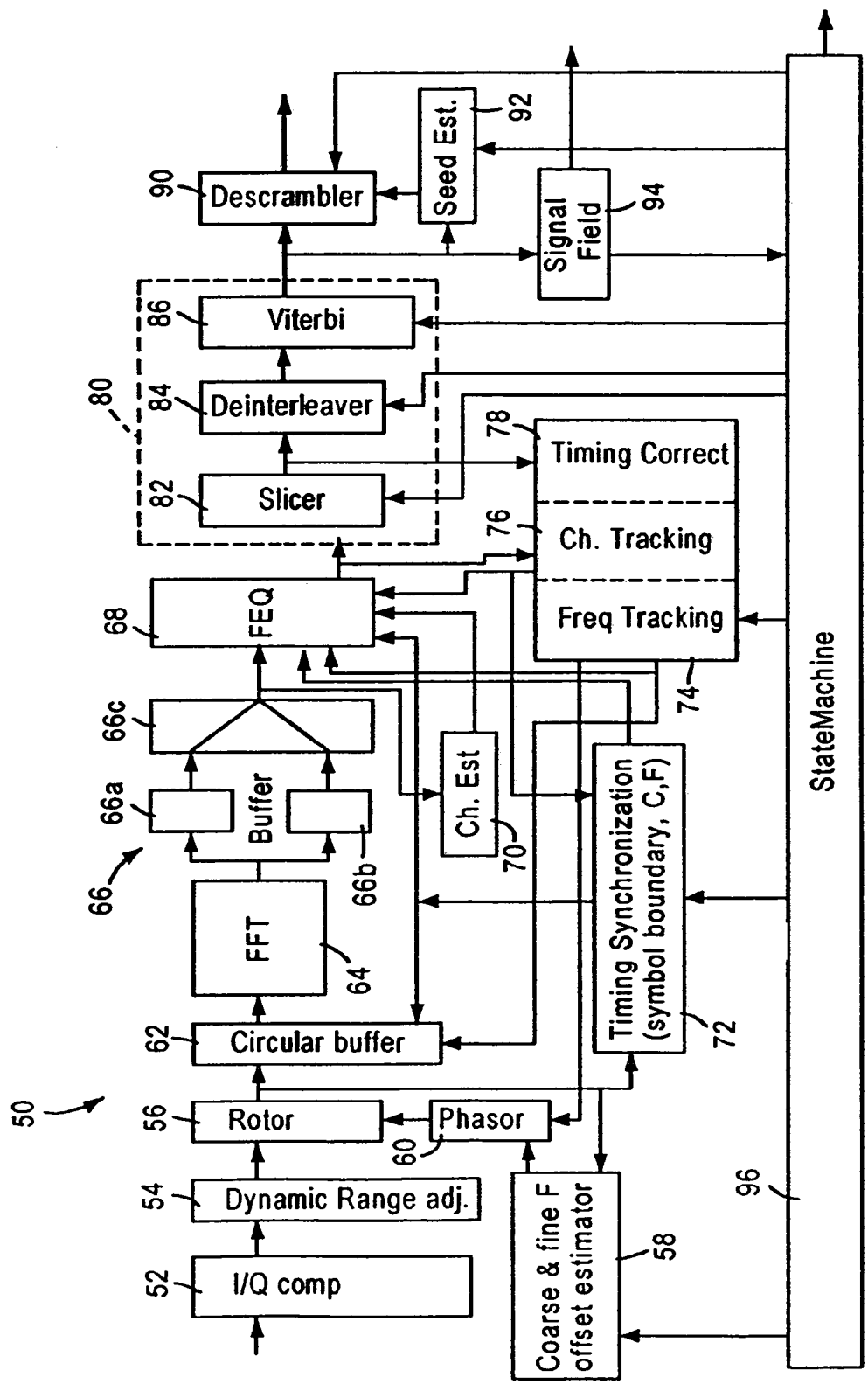
FIG. 2 is a diagram illustrating a receiver module of an IEEE 802.11a OFDM transceiver having a deinterleaver implemented according to an embodiment of the present invention.

FIG. 2 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F front end, for example a receiver amplifier. The detected wireless signal samples include an I component and Q component: these I and Q components, which normally should be orthogonal to each other and have a uniform relative gain, may in fact have a non-orthogonal phase difference (i.e., other than 90 degrees) and have a nonequal gain. Hence, the I/Q mismatch compensation module is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, two identical long training sequences, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequences in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

Channel Estimator Based on Minimum Equalization Error

Figure 1:
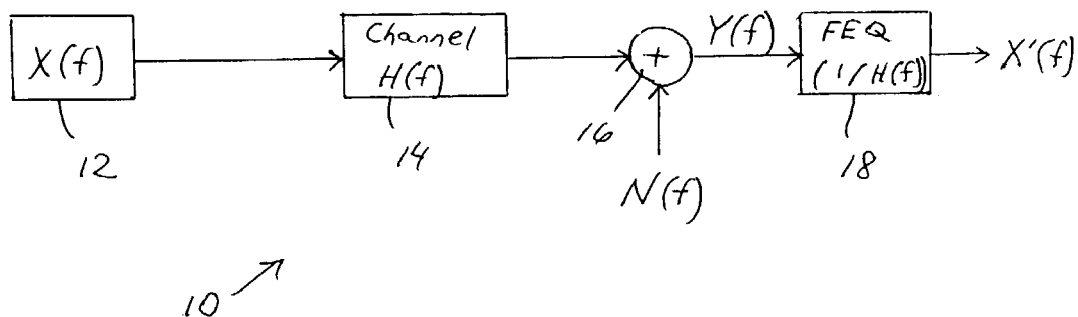
FIG. 1 is a (PRIOR ART) diagram illustrating a frequency based receiver model for equalizing a received signal.
Figure 3:
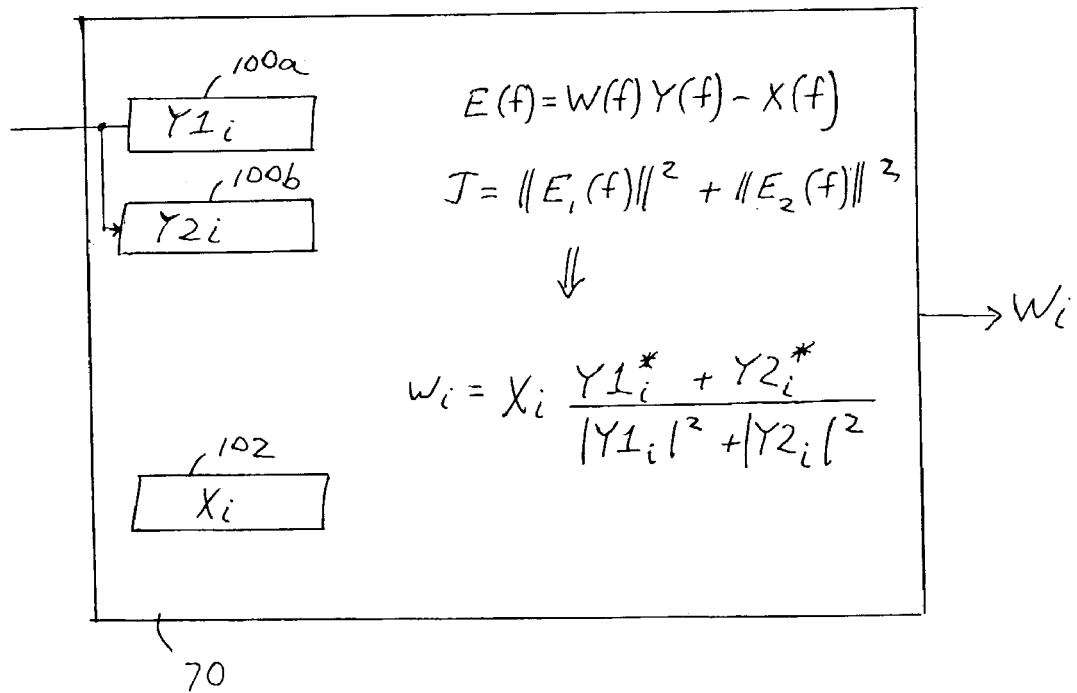
FIG. 3 is a block diagram illustrating a channel estimator configured for supplying equalization coefficients to the frequency equalizer of FIG. 2, according to an embodiment of the present invention.

FIG. 3 is a diagram illustrating in detail the channel estimator 70 of FIG. 2, according to an embodiment of the present invention. The channel estimator 70 is configured for identifying the first and second long preambles 100$a$, 100$b$ from the received wireless signal, each stored in internal latches. In particular, Section 17.3.3 of the IEEE 802.11a Specification describes that the preamble field, used for synchronization, includes ten (10) short symbols and two identical long symbols. The long symbols 100$a$, 100$b$ include 53 subcarriers (including a zero value at DC) which are modulated according to a prescribed sequence. Hence, these prescribed long symbols can be determined by the channel estimator 70 for each tone, illustrated in FIG. 3 as $X_i$ 102. The prescribed long symbols $X_i$ for each of the 53 subcarrier frequencies can be stored internally within the channel estimator 70 in a nonvolatile memory.

As described above, the received wireless signal encounters channel fading, characterized by H(f); hence, the first preamble $Y1_i$ and the second preamble $Y2_i$ for a given tone "i" may have a value that differs from the originally transmitted value $X_i$.

According to the disclosed embodiment, the channel estimator 70 is configured for determining an equalization coefficient $W_i$ for the selected frequency "i" based on the first and second long preambles $Y1_i$ and $Y2_i$, relative to a prescribed preamble value $X_i$ for the selected frequency. In particular, for either of the long preambles, equalization error can be defined as follows:

$$E(f)=W(f)Y(f)-X(f),$$

where W(f) is the estimate for the inverse of H(f).

Further, the channel estimator 70 utilizes the cost function J to measure equalization error over the two long preambles Y1 and Y2:

$$J=\|E_1(f)\|^2+\|E_2(f)\|^2$$

Since the values Y(f) and X(f) are known, the equalization coefficient W(f) can be obtained by minimizing the cost function J. In particular, the minimizing of the cost function J can be approximated by setting the error for a given preamble to zero E(f)=0, resulting in the expression: W(f)=X(f)/Y(f).

Since the symbol values are complex values Y=x+yj, where j represents a complex component unit (i.e., the square root of −1), the expression W(f)=X(f)/Y(f) can be resolved by applying complex conjugate values Y*=x−yj, resulting in the following expression for the complex coefficient $W_i$:

$$W_i=X_i[Y1^*_i+Y2^*_i]/[|Y1_i|^2+|Y2_i|^2]$$

or $$W_i=X_iZ_i,$$

where $Z_i=[Y1^*_i+Y2^*_i]/[|Y1_i|^2+|Y2_i|^2]$.

Figure 4:
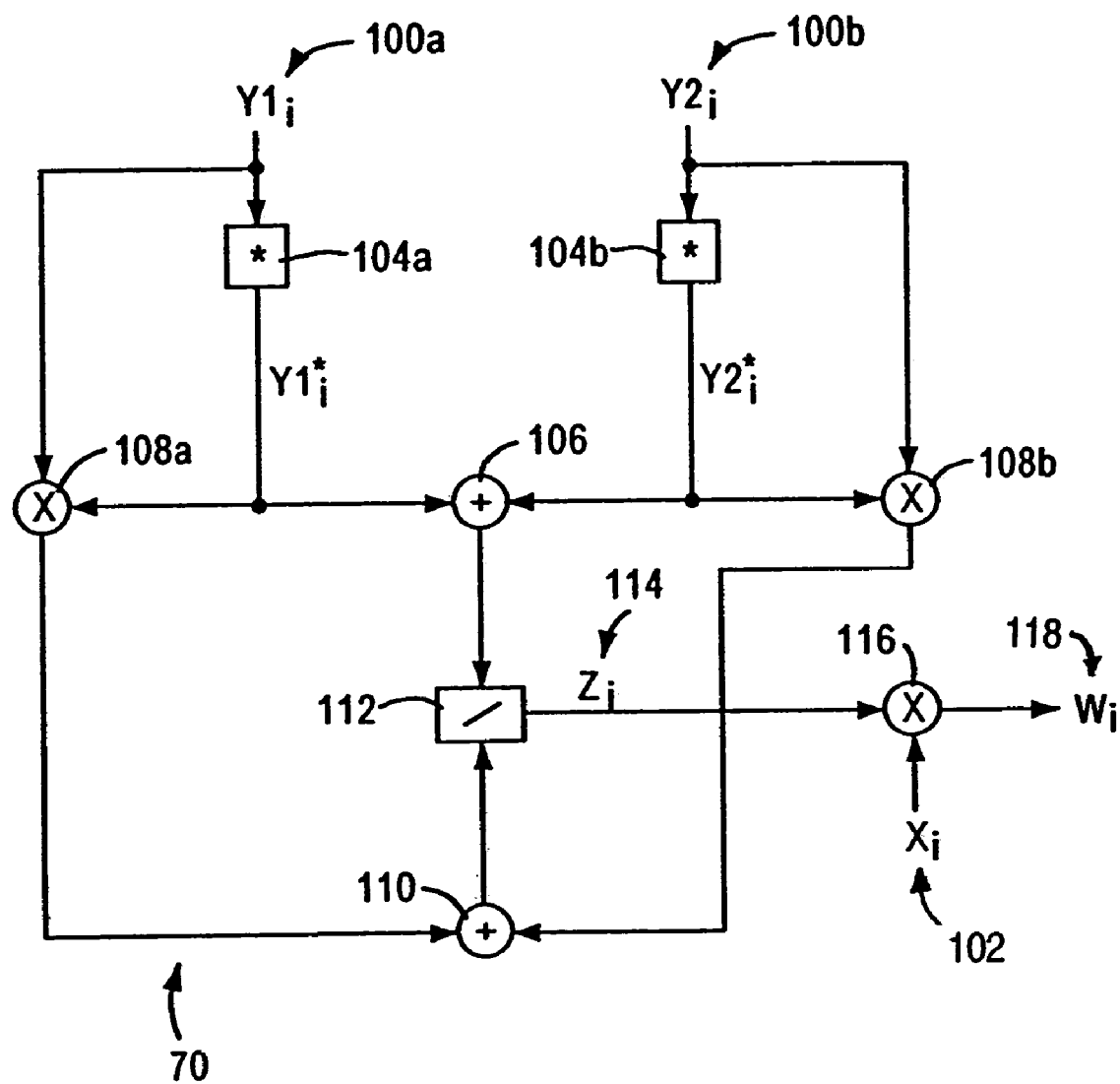
FIG. 4 is a diagram illustrating in detail the channel estimator of FIG. 3, according to an embodiment of the present invention.

FIG. 4 is a diagram illustrating in further detail an implementation of the minimum equalization error based channel estimator 70, according to an embodiment of the present invention. The channel estimator 70 includes complex conjugate generators 104$a$ and 104$b$ configured for generating complex conjugate values for the first and second long preambles 100$a$ and 100$b$, respectively. The complex conjugate values $Y1^*_i$ and $Y2^*_i$ output by the respective complex conjugate generators 104$a$ and 104$b$ are applied to an adder circuit 106 configured for outputting the sum of the complex conjugate values.

The complex conjugate values $Y1^*_i$ and $Y2^*_i$ also are output to respective multiplier circuits 108$a$ and 108$b$ to obtain the square magnitudes $|Y1_i|^2$ and $|Y2_i|^2$ of the respective first and second long preambles 100$a$ and 100$b$. The square magnitudes are summed by an adder circuit 110.

The sum of the complex conjugate values are output from the adder 106 to a divider 112. The divider 112 divides the output from the adder 106 with the summed square magnitudes output by the adder circuit 110. The divider 112 outputs a complex coefficient $Z_i$ 114, specifying the sum of the complex conjugate values relative to the sum of the square magnitudes, to a multiplier 116. The multiplier 116 multiplies the complex coefficient $Z_i$ 114 with the prescribed preamble value Xi 102 to obtain the coefficient value 118 $W_i$ for use by the equalizer 68 of FIG. 2 at the corresponding tone i. The process is repeated for each of the tones i.

According to the disclosed embodiment, equalizer coefficients for a frequency equalizer can be efficiently determined based on estimating the minimum equalization error. Use of the square magnitudes also corresponds to minimizing error energy, since energy is proportional to the square of the magnitudes. Hence, the cost function is consistent with minimizing the energy within the error component. Moreover, equalization can be performed without amplifying the channel noise.

In addition, the channel estimator 70 enables a linear coefficient to be calculated. In particular, if the received signal to the channel estimator 70 is scaled by a factor k (k being a positive real number), the estimator output W(f) is correspondingly scaled by a factor of 1/k. Hence, the equalized output W(f) Y(f) is independent of the factor k, helping to mitigate improper adjustment of signal power by dynamical range.

Channel Tracking by Multiplication Differences

Another disclosed feature involves developing an algorithm using multiplication differences rather than additive differences for channel tracking. In particular, feedback signals from the slicer 82 of FIG. 2 can be used as inputs to drive channel coefficient updates. An example to track coefficients is shown in FIG. 5.

Figure 5:
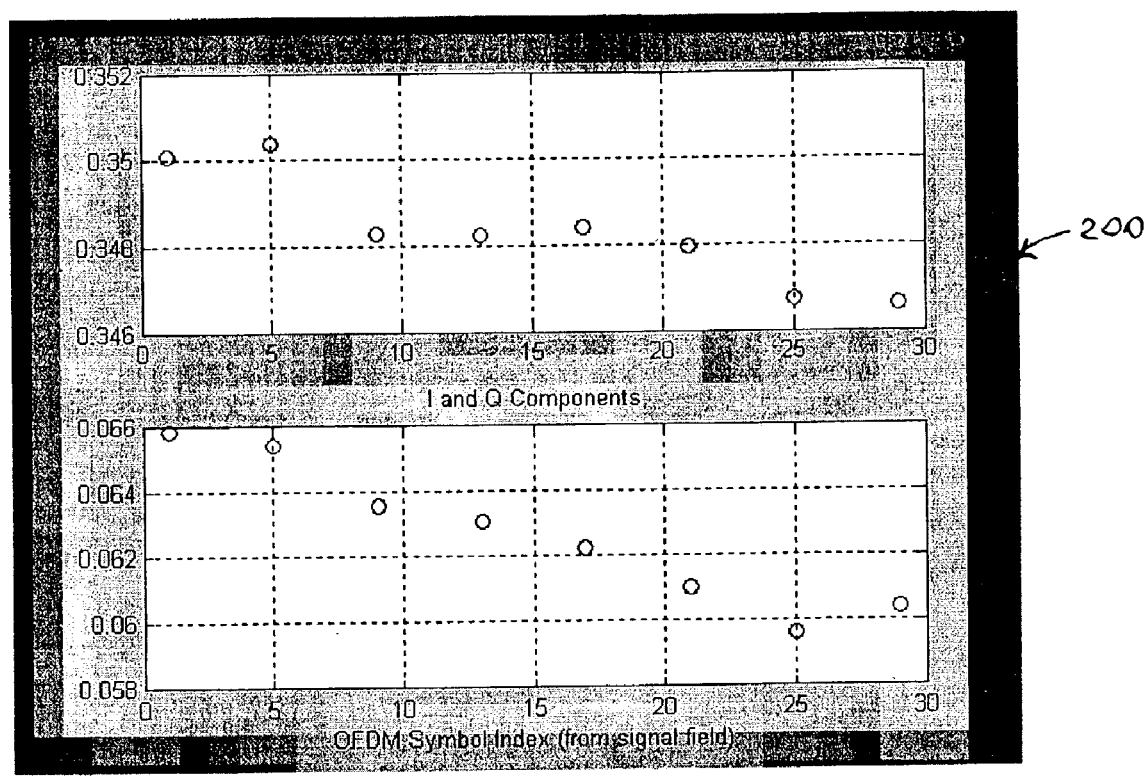
FIG. 5 is a diagram illustrating equalization coefficients for a subcarrier encountering poor-quality channel effects, for use in an additional feature of selecting robust or sensitive channel coefficients.

FIG. 5 is a diagram illustrating a scenario 200 where slowly-varying equalization coefficients for a subcarrier encountering poor signal quality. In particular, the goal for channel tracking is to adapt the equalizer 68 so that its output can compensate for different kinds of disturbance and distortion. However, if the environment is poor, for example the signal to noise ratio is relatively low and/or fading is deep, tracking performance may not be well expected. Hence, some decision schemes for the equalizer need to be designed such that the equalizer can detect adverse and terminal conditions.

A hard-decision flag can be utilized, indicating for each subcarrier frequency whether the recent equalized outputs are of good or poor quality. This flag is determined by recent filtered tracking performance, and can be used to make equalizer coefficients robust when the channel quality is poor, and sensitive when the channel quality is good.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM receiver for generating an equalizer coefficient for equalization of a received wireless signal by a frequency equalizer, the method including:
   identifying first and second long preambles from the received wireless signal;
   determining in a channel estimator an equalization coefficient for a selected frequency based on a minimized cost function for the first and second long preambles relative to a prescribed preamble value for the selected frequency; and
   supplying the equalization coefficient for the selected frequency to the frequency equalizer for said equalization of the received wireless signal by the frequency equalizer;
   wherein the determining step includes:
   generating complex conjugate values for the first and second long preambles, respectively,
   applying the complex conjugate values to the first and second long preambles, respectively, according to the minimized cost function, to obtain a complex coefficient specifying the complex conjugate values relative to square magnitudes of the first and second long preambles, and
   multiplying the complex coefficient with the prescribed preamble value to obtain the equalization coefficient for the corresponding selected frequency.

2. The method of claim 1, wherein the identifying step includes identifying the first and second long preambles according to IEEE 802.11a protocol.

3. The method of claim 1, wherein the prescribed preamble value for the selected frequency is specified according to IEEE 802.11a protocol.

4. An OFDM receiver comprising:
   a frequency equalizer configured for equalizing a received wireless signal for a selected frequency based on a corresponding equalization coefficient; and
   a channel estimator configured for determining the equalization coefficient for the selected frequency based on a minimized cost function for identified first and second long preambles, within the received wireless signal, relative to a prescribed preamble value for the selected frequency, wherein:
   the channel estimator is configured for generating complex conjugate values for the first and second long preambles, respectively, and applying the complex conjugate values to the first and second long preambles, respectively, according to the minimized cost function, to obtain a complex coefficient specifying the complex conjugate values relative to square magnitudes of the first and second long preambles;
   the channel estimator is configured for multiplying the complex coefficient with the prescribed preamble value to obtain the equalization coefficient for the corresponding selected frequency.

5. The OFDM receiver of claim 4, wherein the channel estimator is configured for identifying the first and second long preambles according to IEEE 802.11a protocol.

6. The OFDM receiver of claim 4, wherein the prescribed preamble value for the selected frequency is specified according to IEEE 802.11a protocol.

* * * * *